March 4, 1941.　　　　I. L. SHOGRAN　　　　2,233,717
VALVE MECHANISM
Filed Jan. 3, 1939　　　2 Sheets-Sheet 1

INVENTOR.
IVAR L. SHOGRAN
BY W. B. Churcher
ATTORNEY.

March 4, 1941.                I. L. SHOGRAN                2,233,717
                            VALVE MECHANISM
                          Filed Jan. 3, 1939           2 Sheets-Sheet 2
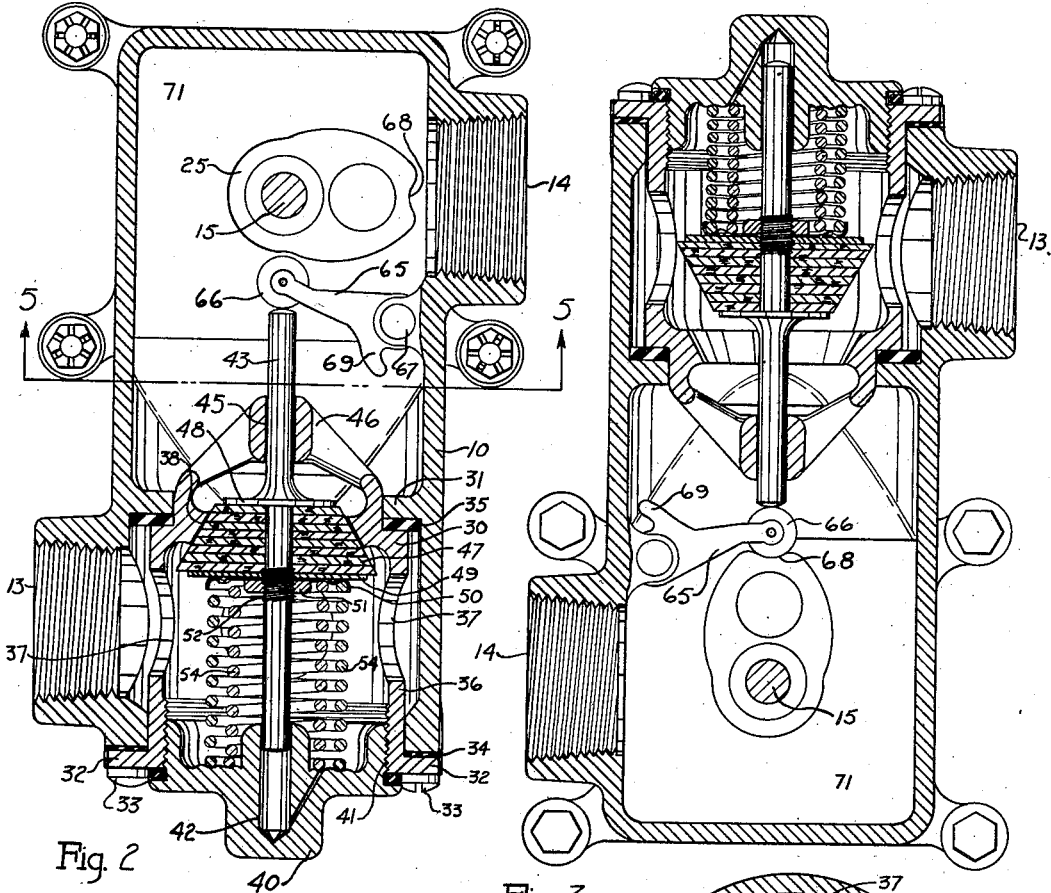
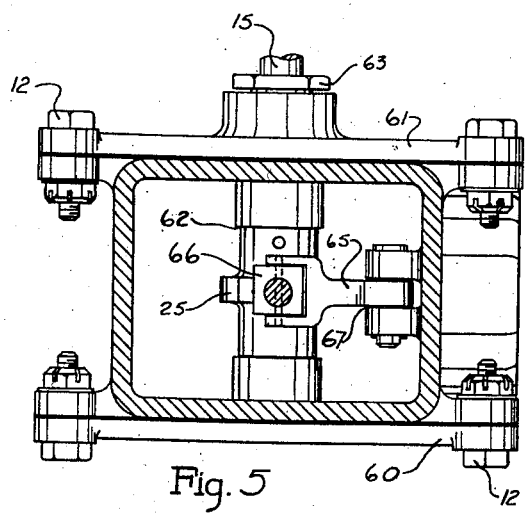
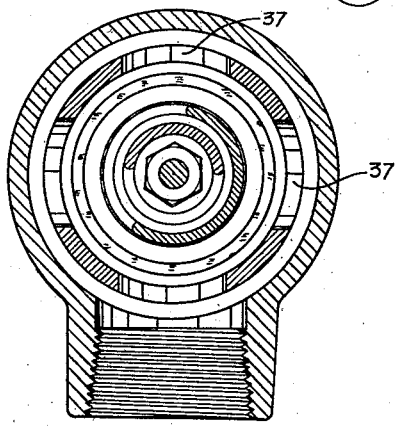
INVENTOR.
IVAR L. SHOGRAN
BY W.B.Churcher
ATTORNEY.

Patented Mar. 4, 1941

2,233,717

UNITED STATES PATENT OFFICE 2,233,717

VALVE MECHANISM

Ivar L. Shogran, Los Angeles, Calif., assignor to Douglas Aircraft Company, Incorporated, Santa Monica, Calif.

Application January 3, 1939, Serial No. 249,001

4 Claims. (Cl. 251—132)

My invention relates to valve mechanisms with particular reference to a construction which is especially well adapted for operation by remote control, as for instance in multiple fuel tank systems.

The general practice in aircraft fuel systems is to employ valves of the ported plug type, but such valves, because of the relatively large friction surfaces not only are subject to leak producing wear but render remote operation difficult and therefore infeasible. Moreover, the ported plugs of conventional valves add considerable weight which is a material disadvantage in aircraft.

The principal object of this invention is to provide a valve mechanism particularly adapted for use in a remotely operable fuel system wherein a plurality of valve mechanisms, each of low weight-capacity ratio, are arranged for efficient and effective operation by the pilot. Other objects are: to reduce the force ordinarily required for remote operation of aircraft fuel valves; to insure a fluid-tight fit between the valve and its seat throughout a prolonged service life; to simplify the replacement of the valve seating members; to prevent accidental closing of an open valve; to provide a valve having a constant rate of lift from its seat thereby assuring smoothness of operation; and to provide a valve mechanism which is particularly well adapted to be used in multiple for operation by a cam shaft. Various other objects and advantages will become apparent as the description proceeds.

In the accompanying drawings:

Figure 2 is a central vertical longitudinal section of one of the valve units taken on line 2—2 of Figure 1 wherein the valve is in the closed position.

Figure 3 is a similar view of one of the valve units taken on line 3—3 of Figure 1 wherein the valve is in the open position.

Figure 4 is a sectional view taken on line 4—4 of Figure 1.

Figure 5 is a sectional view taken on line 5—5 of Figure 2.

Figure 1:
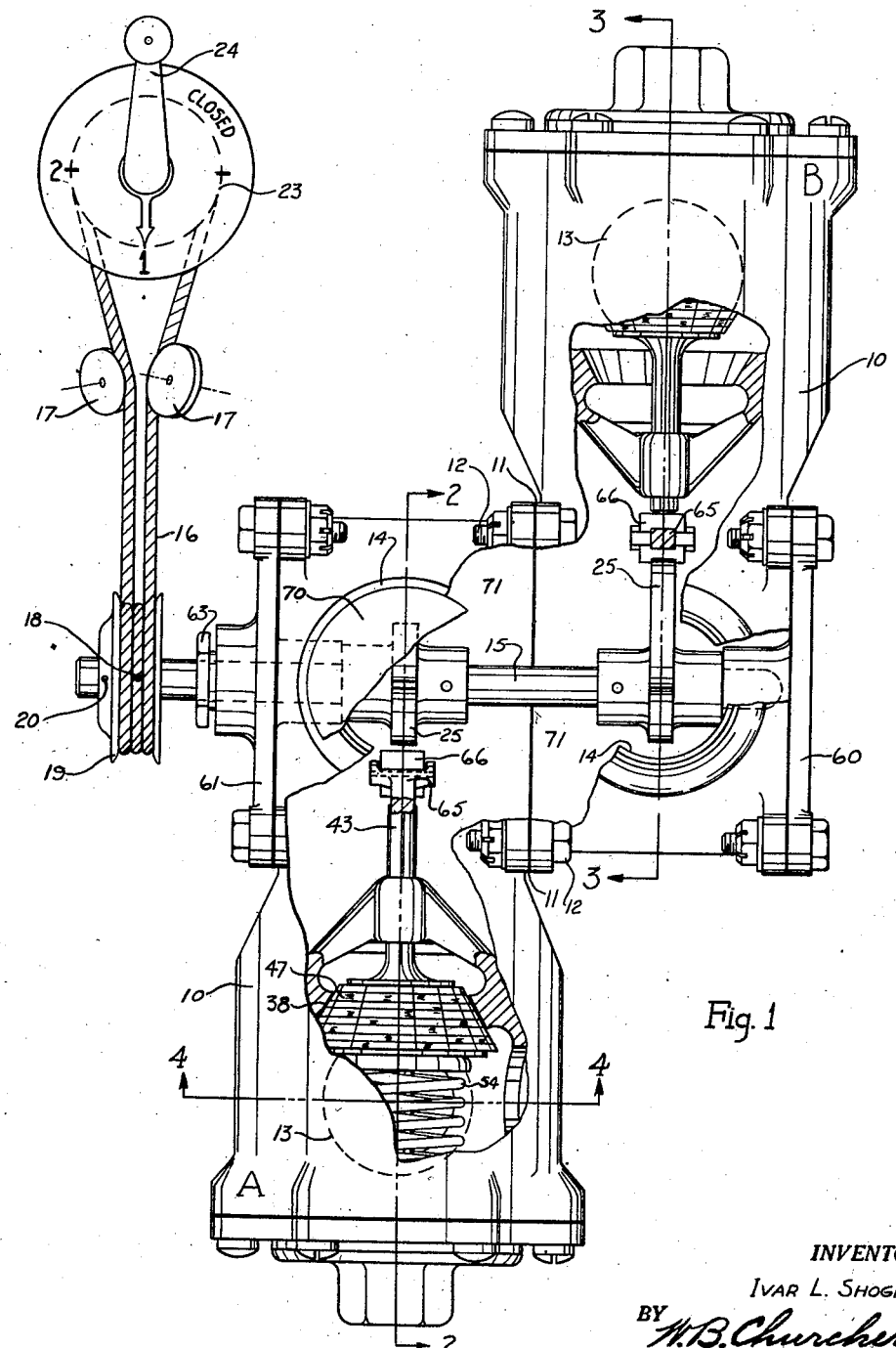
Figure 1 is a side elevation of two valve units connected together for gang operation by remote control.

Referring to Figure 1 wherein, for purposes of illustration, a two-gang valve unit is shown:

One of the valve units is indicated at A, and the second unit is indicated at B, the housings 10 of the units being joined at 11 by bolts 12 and provided with inlet ports 13 and outlet ports 14, the inlet ports being suitable for pipe connections from fluid sources not shown, and the outlet ports being suitable for pipe connection with a fluid consuming device not shown. The valve units A and B are identical except that one is inverted relative to the other, and both are operable by a common cam shaft 15 which is remotely actuable by a cable system 16, including pulleys 17 where needed, and attached at 18 to a sheave 19, the sheave being fastened to the shaft at 20 and the cable extending to a companion sheave 23 having a crank 24 located for convenient operation by the pilot. Cam shaft 15 is provided with a cam 25 within each valve unit and in the arrangement shown, the cam of valve unit A is mounted upon and fixed to the shaft at an angle of 90 degrees from the cam of valve unit B for permiting the valve in unit A to close while the valve in unit B is open. In response to further rotation of the shaft, this may be reversed, or both valves may be closed.

In the other drawings:

Each valve unit has a valve and seat assembly 30 which is fitted into the inlet portion of the valve housing and retained by flanges 31 and 32 and screws 33 in sealing relation by gaskets 34 and 35. Assembly 30 includes a cage 36 having ports 37 and an integral valve seat 38; a cap 40 threaded into the cage at 41 and having a bore 42; a valve stem 43 slidably engaging bore 42 in the cap and a bore 45 in a subtending portion 46 of the cage and a valve 47 carried by stem 43. The valve may be of any material but in the present preferred embodiment consists of synthetic rubber or a plurality of layers of laminated cork retained on the stem intermediate the ends by a collar 48, a washer 49, a spring retainer 50, and a nut 51 engaging a threaded portion 52 of the stem. Compression springs 54 engage the cap and the retainer thereby urging the valve against seat 38. The outlet portion of the valve housing is closed by bearing cover plates 60 and 61 which are fastened to the housing by the bolts 12. Cam shaft 15 is journaled at 62 to the bearing cover plates, bearing plate 61 being sealed by a packing gland 63, and cam 25 is adapted for actuating a guide arm 65, having a follower 66, the guide arm being pivotally connected to housing 10 at 67 and being provided with a radially disposed stop member 69 which is adapted to contact the adjacent wall of housing 10 when the valve unit occupies the inverted position shown in Figures 1 and 2, the valve assembly 30 is removed, to thereby retain the follower in a position for reengagement with the stem 43 while the valve cage is being reassembled in the housing. As the cam revolves, the follower riding on the cam engages a depression in the form of a notch 68 in the cam and is resiliently held in the depression by the action of the springs 54, at which location the valve is fully open. The depression may be of any shape so long as it performs the same function as the notch, for instance, a flat spot in the cam may be utilized.

In combining the units as depicted by Figure 1, cover plate 60 of valve unit A and cover plate 61 of valve unit B are removed and the units joined directly at 11. Joining the units as shown and closing outlet port 14 of one of the units by a plug 70, provides a selector valve having a single outlet chamber 71 and a single outlet port 14.

The operation of one of the valve units will now be described:

Fluid is admitted to the valve through inlet port 13 in the housing and ports 37 in the cage. When cam 25 is in the position shown in Figure 2, springs 54 retain valve 47 against seat 38 so that fluid cannot enter outlet chamber 71 which is defined by the lower portion of housing 10 and cover plates 60 and 61. To displace the valve from its seat, cam shaft 15 is rotated until the cam is placed in the position shown in Figure 3. During the initial cam movement, the cam, the follower 66, attached to guide arm 65, and the valve stem 43, are coengaged and during the remainder of the movement, the stem displaces the valve from the seat, thereby permitting fluid to enter chamber 71 and flow from port 14. The cam follower is utilized for transmitting the force from the cam to the valve stem and the guide arm 65 thereof is employed to materially reduce the side thrust on the stem which would be imposed if the cam engaged the stem directly. Notch 68 is provided in the cam to prevent accidental closing of the valve by the force exerted on the cam by springs 54 as well as to enable the operator to distinguish by feel when the valve is fully open.

When two or more of the valve units are employed as shown in Figure 1, the units are bolted together at 11, the cover plates being omitted from the adjoining portions whereby a common outlet chamber 71 is provided and a common cam shaft 15 is adapted for operating cams 25 which are fixed to the shaft and so oriented that when one unit is open the other is closed. The particular embodiment illustrated functions as a selector valve having two inlet ports 13 and one outlet port 14, the outlet port of valve unit A being plugged, but it is obvious that several valve units may be ganged. In such a combination, an alteration of the cam design is necessary, the alteration comprising an increase in the slope of the cam rise, resulting in a lessening of the angular movement required for full opening of the valve, whereby one valve only will be unseated.

It will be apparent to those skilled in the art that various changes may be made in the construction and arrangement of the parts described in accordance with the teaching of the invention, and I intend to cover all such modifications which fall within the scope of the subjoined claims.

I claim:

1. A valve unit comprising in operative relation, a valve housing forming a chamber having an inlet port and a chamber having an outlet port, a removable valve cage in said inlet port chamber and extending in part into said outlet port chamber, a valve seat in the cage, poppet valve means movable into and out of registry with said seat to control fluid flow from the inlet port to the outlet port, the valve means including a stem slideably carried by the cage and extending into the outlet chamber and a head mounted on the stem, resilient means to urge the valve toward its seat, a shaft mounted for rotation in said outlet chamber, a cam means mounted on said shaft and rotatable therewith, a cam follower riding on the said cam means and interposed between the cam means and the stem, and a guide arm pivotally connected to the housing and attached to the follower, the follower being adapted to engage the stem and raise the valve from its seat.

2. A valve unit comprising in operative relation, a valve housing forming a chamber having an inlet port and a chamber having an outlet port, a removable valve cage in said inlet port chamber and extending in part into said outlet port chamber, a valve seat in the cage, poppet valve means movable into and out of registry with said seat to control fluid flow from the inlet port to the outlet port, the valve means including a stem slideably carried by the cage and extending into the outlet chamber and a head mounted on the stem, dual spring means to urge the valve toward its seat, a shaft mounted for rotation in said outlet chamber, an eccentric cam means mounted on said shaft and rotatable therewith, a depression provided in the cam means at the high point, a cam follower riding on the said cam means and interposed between the cam means and the stem, the follower being adapted to rest on the depression, engage the stem and raise the valve from its seat.

3. A valve unit comprising in operative relation, a valve housing forming a chamber having an inlet port and a chamber having an outlet port, a removable valve cage in said inlet port chamber and extending in part into said outlet port chamber, a valve seat in the cage, poppet valve means movable into and out of registry with said seat to control fluid flow from the inlet port to the outlet port, the valve means including a stem slideably carried by the cage and extending into the outlet chamber and a head of laminated elastic material mounted on the stem, resilient means to urge the valve toward its seat, a shaft mounted for rotation in said outlet chamber, an eccentric cam means mounted on said shaft and rotatable therewith to raise the said valve from its seat, external means for rotating the said shaft, the said means comprising a cable system made up of a sheave connected to said shaft, a cable and a remotely operable companion sheave, the cable connecting the two sheaves, and a dial for indicating the position of the valve.

4. A valve unit comprising in operative relation, a valve housing forming a chamber having an inlet port and a chamber having an outlet port, a removable valve cage in said inlet port chamber and extending in part into said outlet port chamber, the cage having a valve seat, poppet valve means movable into and out of registry with said seat to control fluid flow from the inlet port to the outlet port, the valve means including a stem slideably carried by the cage and extending into the outlet chamber and a laminated elastic head mounted on the stem, dual spring means to urge the valve toward its seat, a shaft mounted for rotation in said outlet chamber, and a cam means mounted on said shaft and rotatable therewith to raise the said valve from its seat.

IVAR L. SHOGRAN.